United States Patent [19]
Dietrich et al.

[11] Patent Number: 5,962,542
[45] Date of Patent: Oct. 5, 1999

[54] PROCESS FOR PRODUCING HYDROCARBON-BLOWN HARD POLYURETHANE FOAMS

[75] Inventors: Karl Werner Dietrich, Odenthal; Norbert Eisen, Köln; Gerhard Heilig, Bergisch Gladbach, all of Germany

[73] Assignee: Bayer Aktiengesellschaft, Leverkusen, Germany

[21] Appl. No.: 09/155,082

[22] PCT Filed: Mar. 10, 1997

[86] PCT No.: PCT/EP97/01198

§ 371 Date: Sep. 18, 1998

§ 102(e) Date: Sep. 18, 1998

[87] PCT Pub. No.: WO97/35899

PCT Pub. Date: Oct. 2, 1997

[30] Foreign Application Priority Data

Mar. 22, 1996 [DE] Germany .................... 196 11 367

[51] Int. Cl.$^6$ ....................................... C08J 9/08
[52] U.S. Cl. .................. 521/131; 521/132; 521/170; 521/172; 521/173; 521/174
[58] Field of Search ................... 521/131, 132, 521/170, 172, 173, 174

[56] References Cited

U.S. PATENT DOCUMENTS

| 5,025,039 | 6/1991 | Neuhaus et al. | 521/130 |
| 5,308,885 | 5/1994 | Doerge | 521/128 |
| 5,391,317 | 2/1995 | Smits | 252/182.24 |
| 5,451,615 | 9/1995 | Birch | 521/132 |
| 5,602,190 | 2/1997 | Lamberts et al. | 521/131 |

OTHER PUBLICATIONS

35th Annual Polyurethane Technical Marketing Conference; "An Insight into the Characteristics of a Nucleation Catalyst in CFC–Free Rigid Foam Systems"; H. Yoshimura, et al, pp. 300–310, (1994).

Database WPI; Derwent Publications Ltd.; AN 95–085467 & JP 07 010 955 A (Polyurethane Kasei KK) (1995).

Database WPI; Derwent Publications Ltd.; AN 94–313741 & JP 06 239 956 A (Sumitomo Bayer Urethane) (1994).

*Primary Examiner*—John M. Cooney, Jr.
*Attorney, Agent, or Firm*—Joseph C. Gil; Noland J. Cheung

[57] ABSTRACT

A process for preparing rigid expanded materials containing urethane and optionally urea and isocyanurate groups, characterised in that a polyurethane rigid foam is prepared by reacting a) an aromatic polyisocyanate with b) a polyol component with on average at least 3 hydrogen atoms which can react with isocyanates, containing 1) 30 to 80 wt. % of an aromatic amine started polyether with a molecular weight of 300 to 800 based on 70 to 100 wt. % of 1,2-propylene oxide and 0 to 30 wt. % of ethylene oxide 2) 10 to 40 wt. % of a substantially sucrose started polyether with a molecular weight of 400 to 1,000 based on 70 to 100 wt. % of 1,2-propylene oxide and 0 to 30 wt. % of ethylene oxide 3) 5 to 30 wt. % of a propylene glycol started polyether with a molecular weight of 500 to 1,500 based on 70 to 100 wt. % of 1,2-propylene oxide and 0 to 30 wt. % of ethylene oxide 4) n-pentane and/or i-pentane as blowing agent 5) water 6) optional auxiliary agents and additives, wherein the sum of the wt. % of components 1), 2) and 3) is 100, is described.

4 Claims, No Drawings

PROCESS FOR PRODUCING HYDROCARBON-BLOWN HARD POLYURETHANE FOAMS

BACKGROUND OF THE INVENTION

It is known that polyurethane rigid foams can be blown with low-boiling alkanes. Cyclic alkanes are used to advantage here because they make an outstanding contribution to the thermal conductivity of the expanded material due to their low gaseous thermal conductivity. Cyclopentane is preferably used.

The beneficial properties when used as an insulator in domestic refrigerators have to be compared with a disadvantageous commercial situation. Thus, a specific quality of polystyrene inner container has to be used, as a result of the solvent properties of cyclopentane.

Furthermore, cyclopentane has the disadvantage, due to its relatively high boiling point of 49° C., that it condenses at low temperatures such as are conventional during the use of polyurethane rigid foams as insulators in domestic refrigerators. Due to the undesired condensation of the blowing agent, a reduced pressure is produced in the cells which again has to be offset by an elevated foam strength or increased density.

Compared with the acyclic homologous pentane compounds, n-pentane and i-pentane, cyclopentane incurs higher manufacturing costs. n-pentane or i-pentane blown systems have been known for some time in the field of polyurethane rigid foams. However, the higher gaseous thermal conductivities, as compared with cyclopentane, which result in poorer thermal insulation capacity of the corresponding expanded systems is a disadvantage.

In addition, the solubility of n-pentane and i-pentane in polyols is much lower than that of cyclopentane, which has a negative effect on production reliability and the adhesion of the expanded material to covering layers.

SUMMARY OF THE INVENTION

The object of the present invention was to develop a n-pentane or i-pentane blown rigid foam in which the disadvantages mentioned above are overcome.

Surprisingly, it has now been found that polyol formulations based on aromatic amines, sucrose and propylene glycol provide expanded materials with good adhesive properties and lower thermal conductivities. The solubility of acyclic pentanes satisfies all the requirements.

DETAILED DESCRIPTION OF THE INVENTION

The present invention therefore provides a process for preparing rigid expanded materials containing urethane and optionally isocyanurate groups, characterised in that a polyurethane rigid foam is prepared by reacting a) an aromatic polyisocyanate with
b) a polyol component with on average at least 3 hydrogen atoms which can react with isocyanates, containing
   1) 30 to 80 wt. % of an aromatic amine started polyether with a molecular weight of 300 to 700 based on 70 to 100 wt. % of 1,2-propylene oxide and 0 to 30 wt. % of ethylene oxide
   2) 10 to 40 wt. % of a substantially sucrose started polyether with a molecular weight of 400 to 1,000 based on 70 to 100 wt. % of 1,2-propylene oxide and 0 to 30 wt. % of ethylene oxide
   3) 5 to 30 wt. % of a propylene glycol started polyether with a molecular weight of 500 to 1,500 based on 70 to 100 wt. % of 1,2-propylene oxide and 0 to 30 wt. % of ethylene oxide
   4) n-pentane and/or i-pentane as blowing agent
   5) water
   6) optional auxiliary agents and additives, wherein the sum of the wt. % of components 1), 2) and 3) is 100.

Amine started polyethers are preferably understood to be those based on o-toluylene diamine. This starter is preferably reacted with 1,2-propylene oxide. The molecular weight of these polyethers is preferably between 300 and 800, in particular between 500 and 600. In polyol formulations, the proportion of aromatic aminopolyether is preferably 30 to 80 wt. %, in particular 35 to 70 wt. %.

The sucrose started polyethers are preferably prepared by reaction with 1,2-propylene oxide; diethylene glycol, ethylene glycol or propylene glycol in amounts of 10 to 30 wt. % is optionally used as a co-starter.

The molecular weight is preferably between 400 and 1,000, in particular between 500 and 600. In polyol formulations, the proportion of sucrose started polyethers is preferably 10 to 40 wt. %, in particular 15 to 35 wt. %.

Propylene glycol started polyethers are also prepared by reaction with 1,2-propylene oxide.

Propylene glycol started polyethers with a molecular weight between 500 and 1,500 are preferably used, in particular between 900 and 1,100.

In polyol formulations, their proportion is preferably 5 to 30 wt. %, in particular 15 to 25 wt. %.

By using polyol formulations in accordance with the invention, n-pentane and i-pentane blown expanded materials with low thermal conductivities and good adhesion to covering layers are prepared.

The polyol formulations contain between 0.5 and 3.5 wt. %, preferably between 1.5 and 2.5 wt. %, of water as co-blowing agent.

Any starting components known per se may be used as polyisocyanates in the process according to the invention.

The isocyanate components are, e.g. aromatic polyisocyanates such as are described, for instance, by W. Siefkin in Justus Liebigs Annalen der Chemie, 562, pages 75 to 136, for example those of the formula

$Q(NCO)_n$ in which
n is 2 to 4, preferably 2 and
Q represents an aliphatic hydrocarbon group with 2 to 18, preferably 6 to 10, carbon atoms, a cycloaliphatic hydrocarbon group with 4 to 15, preferably 5 to 10, carbon atoms, an aromatic hydrocarbon group with 8 to 15, preferably 8 to 13, carbon atoms, e.g. polyisocyanates like those which are described in DE-OS 2 832 253, pages 10 to 11.

Industrially readily accessible polyisocyanates are generally particularly preferred, e.g. 2,4 and 2,6-toluylene diisocyanate and any mixture of these isomers ("TDI), polyphenylpolymethylene polyisocyanates such as can be prepared by aniline/formaldehyde condensation and subsequent phosgenation (crude "MDI") and polyisocyanates with carbodiimide groups, urethane groups, allophanate groups, isocyanurate groups, urea groups or biuret groups ("modified polyisocyanates"), in particular modified polyisocyanates which are derived from 2,4 and 2,6-toluylene diisocyanate or from 4,4' and/or 2,4'-diphenylmethane diisocyanate.

Paraffins or fatty alcohols or dimethylpolysiloxanes as well as pigments or colorants, also stabilisers against the effects of ageing and weathering, plasticisers and anti-fungal or anti-bacterial substances as well as fillers such as barium sulphate, kieselguhr, carbon black or prepared chalk, may also be incorporated.

Further examples of optionally incorporated surface active additives and foam stabilisers, as well as cell regulators, reaction retardants, stabilisers, flame inhibiting substances, colorants and fillers as well as anti-fungal and anti-bacterial substances for use according to the invention and details about the use and effects of these additives are described in Kunststoff-Handbuch, vol. VII, published by Vieweg and Höchtlen, Carl-Hanser-Verlag, Munich, 1966, e.g. on pages 121 to 205.

When preparing a foam, according to the invention the foaming procedure may also be performed in closed moulds. In this case the reaction mixture is introduced into a mould. Suitable mould materials are metals, e.g. aluminium, or plastics, e.g. epoxide resin. The foamable reaction mixture foams in the mould and forms the moulded item. The mould-foaming procedure may be performed in such a way that the moulded item has a cellular structure at its surface. It may also be performed, however, in such a way that the moulded item has a solid skin and a cellular core. According to the invention, the procedure in the first case is to introduce sufficient foamable reaction mixture into the mould for the foam produced to just fill the mould. The mode of operation in the last-mentioned case comprises introducing more foamable reaction mixture into the mould than is required to fill the interior of the mould with foam. In the latter case, therefore, the process uses "overcharging", a type of procedure which is known. e.g. from U.S. Pat. Nos. 3,178,490 and 3,182,104.

The invention also provides use of the rigid foam prepared according to the invention as an intermediate layer for laminated elements and for filling hollow spaces with foam in the domestic refrigerator industry.

The process according to the invention is preferably used for filling the hollow cavities in refrigerators and freezers with foam.

Obviously, expanded materials may also be produced by block foaming or by the double transport method which is known per se.

The rigid foams obtainable according to the invention are used, for instance, in the building industry and for the insulation of long-distance energy pipes and containers.

The following examples are intended to explain the invention without, however, restricting its scope.

EXAMPLE 1
(comparison example)
Formulation for polyurethane rigid foam
Component A:

75 parts by wt. sucrose (80 wt. %) and propylene glycol (20 wt. %) started polyether with a molecular weight of 600 based on 1,2-propylene oxide
25 parts by wt. propylene glycol started polyether with a molecular weight of 1,000 based on 1,2-propylene oxide
2.5 parts by wt. water
2.0 parts by wt. foam stabiliser, B 8423 (from Goldschmidt)
2.0 parts by wt. activator, Desmorapid 726b (Bayer AG)

Component B:

125 parts by wt.    crude MDI (NCO content = 31.5 wt. %)

100 parts by wt. of component A were mixed with 11 parts by wt. of n-pentane and 128 parts by wt. of component B using a stirrer (1,000 rpm) at 20° C. and compressed in a closed mould at 34 kg/m³.

EXAMPLE 2
(comparison example)
Component A 50 parts by wt. o-toluylene diamine started polyether with a molecular weight of 560 based on 1,2-propylene oxide
50 parts by wt. sucrose (80 wt. %) and propylene glycol (20 wt. %) started polyether with a molecular weight of 600 based on 1,2-propylene oxide
2.5 parts by wt. water
2.0 parts by wt. foam stabiliser, B 8423 (from Goldschmidt)
2.0 parts by wt. activator, Desmorapid 726b (Bayer AG)

Component B:

141 parts by wt.    crude MDI (NCO content = 31.5 wt. %)

100 parts by wt. of component A were mixed with 11 parts by wt. of n-pentane and 141 parts by wt. of component B using a stirrer (1,000 rpm) at 20° C. and compressed in a closed mould at 34 kg/m³.

EXAMPLE 3
(comparison example)
Component A 75 parts by wt. o-toluylene diamine started polyether with a molecular weight of 560 based on 1,2-propylene oxide
25 parts by wt. propylene glycol started polyether with a molecular weight of 1,000 based on 1,2-propylene oxide
2.5 parts by wt. water
2.0 parts by wt. foam stabiliser, B 8423 (from Goldschmidt)
2.0 parts by wt. activator, Desmorapid 726b (Bayer AG)

Component B:

115 parts by wt.    crude MDI (NCO content 31.5 wt. %).

100 parts by wt. of component A were mixed with 11 parts by wt. of n-pentane and 115 parts by wt. of component B using a stirrer (1,000 rpm) at 20° C. and compressed in a closed mould at 34 kg/m³.

EXAMPLE 4
(according to the invention)
Component A 50 parts by wt. o-toluylene diamine started polyether with a molecular weight of 560 based on 1,2-propylene oxide
30 parts by wt. sucrose (80 wt. %) and propylene glycol (20 wt. %) started polyether with a molecular weight of 600 based on 1,2-propylene oxide
20 parts by wt. propylene glycol started polyether with a molecular weight of 1,000 based on 1,2-propylene oxide
2.5 parts by wt. water -continued

| | |
|---|---|
| 2.0 parts by wt. | foam stabiliser, B 8423 (from Goldschmidt) |
| 2.0 parts by wt. | activator, Desmorapid 726b (Bayer AG) |

Component B

| | |
|---|---|
| 124 parts by wt. | crude MDI (NCO content 31.5 %) |

100 parts by wt. of component A were mixed with 11 parts by wt. of n-pentane and 124 parts by wt. of component B using a stirrer (1,000 rpm) at 20° C. and compressed in a closed mould at 34 kg/m$^3$.

Results

The test values given in the following Table were obtained using the foam sheets produced in examples 1 to 4.

| Example | Thermal conductivity [mW/mK] acc. to DIN 52616, 24° C. | Compression strength [MPa] acc. to DIN 53421, 10 % compression | Adhesion [MPa] acc. to DIN 53292 to sheet metal | Limiting sol. [GT/100 GT polyol] of n-pentane in polyol mixture, 20° C. |
|---|---|---|---|---|
| 1 | 24 | 0.18 | 0.09 | 9 |
| 2 | 23.5 | 0.16 | 0.01 | 11 |
| 3 | 23.3 | 0.10 | 0.12 | 25 |
| 4 | 22.7 | 0.17 | 0.11 | 20 |

As shown by the tests, only the foam in example 4 according to the invention exhibits good to very good properties with regard to thermal conductivity, compression strength, adhesion to sheet metal and solubility of pentane in the polyol formulation.

Comparison example 1 produces foam with a high thermal conductivity. Furthermore, the solubility of pentane in the polyol is not sufficient.

The foam produced in comparison example 2 has an inadequate adhesion to sheet metal; the pentane solubility is in the limiting region.

Comparison example 3 produces foam with good adhesion and good pentane solubility in the polyol formulation; but inadequate compression strength.

We claim:

1. A process for preparing rigid expanded materials containing urethane and optionally urea and isocyanurate groups, characterised in that a polyurethane rigid foam is prepared by reacting a) an aromatic polyisocyanate with b) a polyol component with on average at least 3 hydrogen atoms which can react with isocyanates, containing 1) 30 to 80 wt. % of an aromatic amine started polyether with a molecular weight of 300 to 800 based on 70 to 100 wt. % of 1,2-propylene oxide and 0 to 30 wt. % of ethylene oxide 2) 10 to 40 wt. % of a substantially sucrose started polyether with a molecular weight of 400 to 1,000 based on 70 to 100 wt. % of 1,2-propylene oxide and 0 to 30 wt. % of ethylene oxide 3) 5 to 30 wt. % of a propylene glycol started polyether with a molecular weight of 500 to 1,500 based on 70 to 100 wt. % of 1,2-propylene oxide and 0 to 30 wt. % of ethylene oxide 4) n-pentane and/or i-pentane as blowing agent 5) water 6) optional auxiliary agents and additives, wherein the sum of the wt. % of components 1), 2) and 3) is 100.

2. A process according to claim 1, characterised in that an aromatic amine started polyether based on o-toluylene diamine is used.

3. A process according to claim 1, characterised in that a polyol component with 50 to 60 wt. % of toluylene diamine started polyether with a molecular weight of 450 to 650 based on 1,2-propylene oxide is used.

4. A process according to claim 1, characterised in that a polyol component with 10 to 25 wt. % of a propylene glycol started polyether with a molecular weight of 800 to 1,200 based on 1,2-propylene oxide is used.

* * * * *